July 10, 1923.
J. W. PRIMROSE
EYESHIELD ATTACHMENT FOR MOTOR VEHICLES
Filed Oct. 21, 1922
1,461,289
2 Sheets-Sheet 2
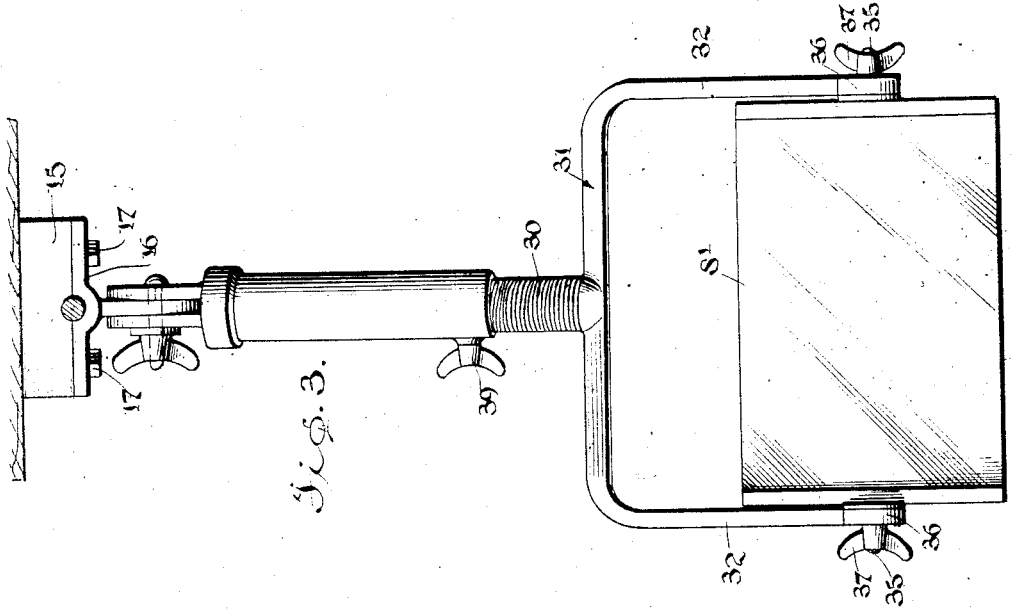
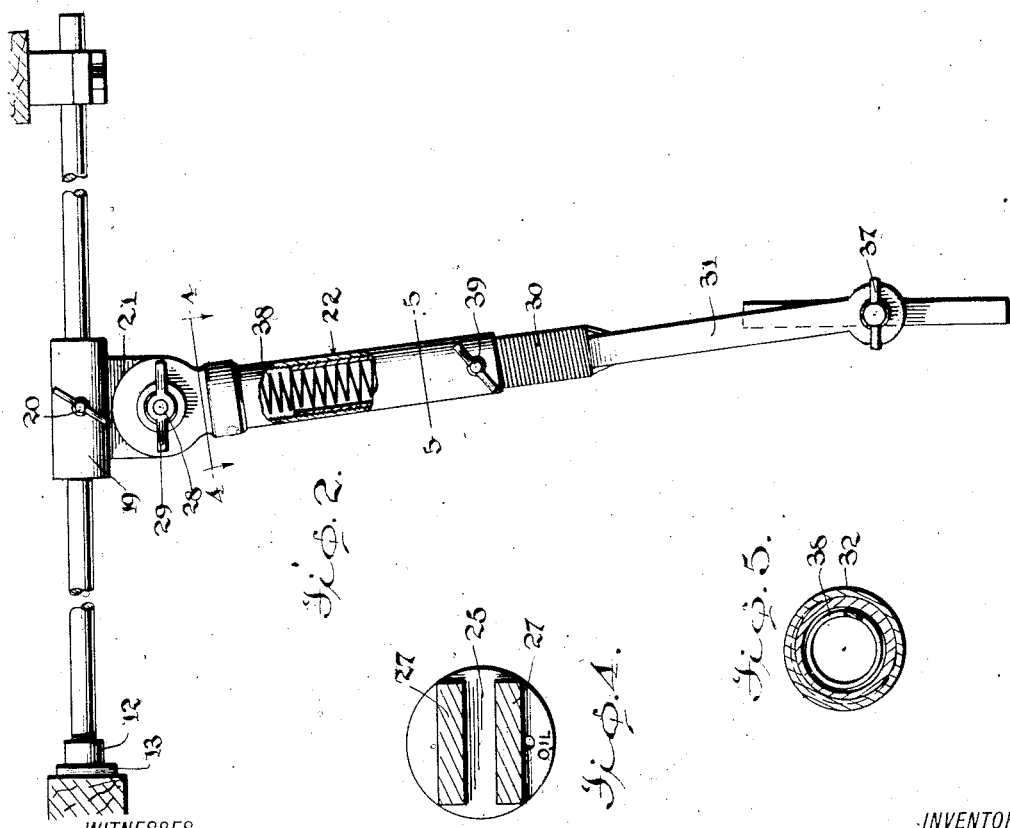

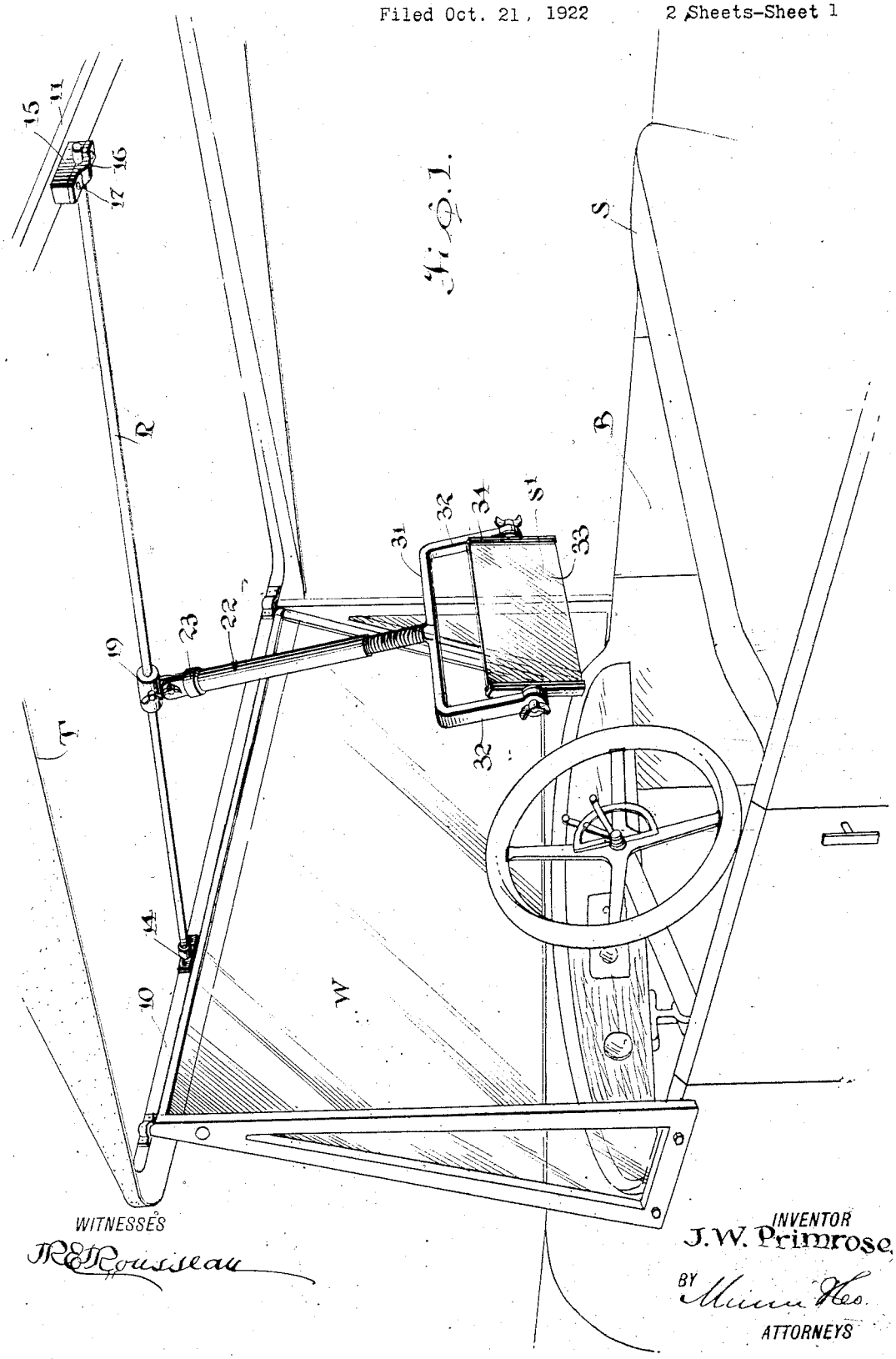

Patented July 10, 1923.

1,461,289

UNITED STATES PATENT OFFICE.

JOHN WILLIAM PRIMROSE, OF CLARKSDALE, MISSISSIPPI.

EYESHIELD ATTACHMENT FOR MOTOR VEHICLES.

Application filed October 21, 1922. Serial No. 595,955.

*To all whom it may concern:*

Be it known that I, JOHN W. PRIMROSE, a citizen of the United States, and a resident of Clarksdale, in the county of Coahoma and State of Mississippi, have invented certain new and useful Improvements in Eyeshield Attachments for Motor Vehicles, of which the following is a specification.

The invention relates to an eye shield attachment for motor vehicles.

The object of the invention is to provide an eye shield for drivers of motor vehicles which may be positioned immediately forward of the driver of a motor vehicle and at the rear of the windshield associated with the motor vehicle, and thereby efficiently protecting the operator or driver's eyes from the sun glare or from lights of oncoming motor vehicles in a highly efficient manner.

It is also an object of the invention that the eye shield supporting means be adapted to permit adjustment of the shield whereby to bring the same into any position desired with relation to the line of vision of the user.

A further and important object of the invention is that the supporting means for the shield be adapted to eliminate any possibility of the shield moving from its adjusted position.

It is also within the scope of the objects of the invention that the shield attachment will in no way detract from the artistic appearance of the motor vehicle to which the same may be applied.

Other objects, and objects relating to details of construction, combination and arrangement of parts will hereinafter appear in the detailed description to follow.

The invention is illustrated by way of example in the accompanying drawings, in which:—

Figure 1 is a perspective of the forward portion of a motor vehicle and showing the present invention applied.

Figure 2 is a view in side elevation particularly illustrating the supporting means for a shield.

Figure 3 is a rear elevation of the same, and

Figures 4 and 5 are transverse sectional views taken substantially on the lines 4—4 and 5—5 of Figure 2.

Referring to the drawings more particularly, B indicates generally the body of an automobile, S the front or driver's seat thereof, W the windshield and T the top. In the present construction at 10 is indicated the forward cross member of the top T and at 11 a bow of said top.

In carrying out the present invention there is supported between the cross member 10 and bow 11 a rod R. The forward end of the rod is threaded into a nipple 12 formed upon a plate 13, and the plate 13 is in turn detachably secured to the cross member 10 by the means of screws, or the like, as indicated at 14. Upon the under surface of the bow 11 there is secured a block 15 upon which there is placed a strap 16, said strap and block having cooperating surfaces or faces adapted to provide an opening through which the rear end of the rod R may be extended. The block 15 and strip 16 may be secured together and also secured to the bow 11 by the means of bolts or screws as indicated at 17. The block 15 and the member 16 serve as clamping means whereby to rigidly secure the rear end of the rod R to the bow 11.

Slidable upon the rod R is a collar or sleeve 19 through which there is threaded a set screw 20 which is provided with a wing nut, as shown, in order that the same may be easily rotated. The purpose of the set screw is to rigidly secure the sleeve or collar 19 upon the rod R. The sleeve 19 has formed therewith upon its outer peripheral surface a radially extending lug 21. A coupling member 22 is provided which consists in a tubular member, as shown, having threaded upon its upper end a collar 23 which is formed with an end closure 25, and said end closure in turn having formed therewith a pair of tangs 27 which are adapted to receive therebetween the radial extension 21 of the sleeve 19. The tangs 27 and radial extension 21 are provided with aligned openings through which a pivot bolt 28 may be extended, said bolt carrying a wing nut 29 whereby the tangs 27 may be clamped to the radial extension 21.

The interior of the tubular or coupling member 22 is threaded, as shown to advantage in Figure 2 of the drawings, and adapted to receive a hollow and exteriorly threaded stem 30. The lower end of the stem terminates in a U-shaped member 31, and between the leg portions 32 of this U-shaped member there is pivoted an eye shield S'. The eye shield may consist in a plate or glass 33 of any color desired, preferably green, and said plate is supported between a pair of channel members 34, one being fitted upon each edge thereof, and each channel member having formed therewith a stud 35 which may extend through a suitable opening in the terminal enlargement 36 of the associated leg 32 of the U-shaped member 31. A wing nut 37 is provided for each stud 35 whereby to adjustably hold the shield S against rotation.

Within the hollow stem 30 there is positioned a coiled spring 38 which is adapted to press against the end closure 25 of the member 22 and thus establish a more rigid connection between the members 38 and 30. Also a set screw is threaded through the member 22 as at 39, and said set screw carrying a wing nut, as shown in Figures 2 and 3 whereby the same may be adjusted. The purpose of the set screw 39 is to adjustably hold the stem 30 against rotation.

It is believed apparent from the description heretofore given of the present invention, that the same may be quickly and easily applied to a motor vehicle of the construction shown. Also it is to be understood that I am not to be limited to the particular supporting means, as it is entirely obvious that this arrangement could be easily changed by those skilled in the art to suit existing conditions.

In the use of the present device, the shield should be positioned, as shown in Figure 1, and the same will then be disposed in the line of vision of the driver, that is, directly forward to the driver. By having the shield in this position, the driver's eyes are protected from the sun rays and also protected from lights of oncoming motor vehicles or the like. The angle in which the shield S¹ may be adjusted is accomplished by manipulating the wing nuts 37. Also by loosening the set screw 39 the windshield may be rotated thereby to further adjust the same. Again through the means of the connection between the sleeve 19 and coupling member 22 the windshield may be swung rearwardly and forwardly and adjusted in the desired position. Also the sleeve 19 may be moved forwardly or rearwardly and suspend the windshield at the point desired. In fact the numerous adjustments possible provide what may be termed a "universal connection" between the rod R and the windshield S¹.

It should also be here stated that the rod R may be quickly and easily removed when desired. This may be accomplished by removing the clamping member 16 and then unscrewing the rod from the nipple 12.

While I have shown and described the preferred form of my invention, I wish it to be understood that I am aware of the fact that the construction, combination and arrangement of parts may be changed by those skilled in the art without departing from the spirit of the invention as indicated by the appended claims.

I claim:—

1. In combination with a motor vehicle having a top, a rod supported by said top longitudinally thereof, and means depending from said rod adapted to support a windshield forward of the driver's seat of the motor vehicle.

2. In combination with a motor vehicle having a top, a rod supported by said top longitudinally thereof, and means carried by said rod adjustable longitudinally thereof and adapted to suspend a shield forward of the driver's seat of the motor vehicle.

3. In combination with a motor vehicle having a top, a rod supported by said top extending longitudinally thereof, and a supporting member carried by said rod adapted to be swung forwardly and rearwardly and carrying at its lower end a shield adapted to be brought to a position forward of the driver's seat of said motor vehicle.

4. In combination with a motor vehicle having a top, a rod secured between the bows of the top and extending longitudinally thereof, and means depending from said rod adapted to support a shield forward of the driver's seat of the motor vehicle.

5. In combination with a motor vehicle having a top, a rod carried by the top and extending longitudinally thereof, said rod being removably supported by the top, and means depending from said rod adapted to carry a shield and said shield adapted to be brought in line of vision with the driver of the motor vehicle.

6. In combination with a motor vehicle having a top, a rod carried by the bows of said top and extending longitudinally of the motor vehicle, a sleeve carried by said rod and longitudinally adjustable thereon, said sleeve having a radial projection, a supporting member having its ends formed with a pair of tangs adapted to receive the radial projection, means whereby the tangs may be adjustably clamped to said radial projection and thereby permit adjustable forward and rearward swinging movement of said supporting member, and a shield carried upon the lower end of said supporting member.

7. In combination with a motor vehicle having a top, a rod carried by the bows of said top and extending longitudinally of the motor vehicle, a sleeve carried by said rod and longitudinally adjustable thereon, said sleeve having a radial projection, a supporting member having its ends formed with a pair of tangs adapted to receive the lateral projection, means whereby the tangs may be adjustably clamped to said radial projection and thereby permit adjustable forward and rearward swinging movement of said supporting member, a shield carried upon the lower end of said supporting member, and means whereby said shield may be rotated about its longitudinal axis.

8. In combination with a motor vehicle having a top, a rod carried by the bows of said top and extending longitudinally of the motor vehicle, a sleeve carried by said rod and longitudinally adjustable thereon, said sleeve having a radial projection, a supporting member having its ends formed with a pair of tangs adapted to receive the lateral projection, means whereby the tangs may be adjustably clamped to said radial projection and thereby permit adjustable forward and rearward swinging movement of said supporting member, a shield carried upon the lower end of said supporting member, and means whereby said shield may be adjustably raised and lowered.

JOHN WILLIAM PRIMROSE.